United States Patent
Lee et al.

(10) Patent No.: US 10,035,152 B2
(45) Date of Patent: Jul. 31, 2018

(54) SOLENOID VALVE

(71) Applicants: HYUNDAI MOTOR COMPANY, Seoul (KR); KIA MOTORS CORPORATION, Seoul (KR)

(72) Inventors: June Ho Lee, Seoul (KR); Youngchul Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/266,278

(22) Filed: Sep. 15, 2016

(65) Prior Publication Data

US 2017/0282191 A1    Oct. 5, 2017

(30) Foreign Application Priority Data

Mar. 29, 2016  (KR) .................. 10-2016-0037412

(51) Int. Cl.
| | |
|---|---|
| *E03B 7/07* | (2006.01) |
| *B03C 1/30* | (2006.01) |
| *F16K 31/06* | (2006.01) |
| *F16K 11/07* | (2006.01) |
| *B03C 1/23* | (2006.01) |

(52) U.S. Cl.
CPC ............... *B03C 1/30* (2013.01); *B03C 1/23* (2013.01); *F16K 11/07* (2013.01); *F16K 31/0613* (2013.01); *F16K 31/0675* (2013.01)

(58) Field of Classification Search
CPC ........ F16K 31/082; F16K 31/10; F16K 11/07; B03C 1/23
See application file for complete search history.

(56) References Cited

U.S. PATENT DOCUMENTS

| | | | |
|---|---|---|---|
| 6,000,674 A | * | 12/1999 | Cheng ................. E03D 3/06 137/545 |
| 2003/0160672 A1 | * | 8/2003 | Ott ................. F16K 31/0606 335/220 |
| 2014/0318649 A1 | * | 10/2014 | So ................. F16K 31/0668 137/599.14 |

FOREIGN PATENT DOCUMENTS

| | | |
|---|---|---|
| JP | S58-158101 A | 9/1983 |
| JP | S58-158101 U | 10/1983 |
| JP | H11-072177 A | 3/1999 |
| JP | 2006125292 A * | 5/2006 |
| KR | 10-2009-0047706 A | 5/2009 |
| KR | 10-1160471 B1 | 6/2012 |

* cited by examiner

*Primary Examiner* — John K Fristoe, Jr.
*Assistant Examiner* — Angelisa L Hicks
(74) *Attorney, Agent, or Firm* — McDermott Will & Emery LLP

(57) ABSTRACT

A solenoid valve includes: a magnetic force generating coil generating an electromagnetic force; a valve spool reciprocated depending on an electromagnetic force generated from the magnetic force generating coil; a holder having the valve spool inserted into a hollow portion of the holder and forming a plurality of ports opened and closed depending on the reciprocating motion of the valve spool; a foreign material collecting coil collecting a foreign material when power is applied to the magnetic force generating coil to serve as an electromagnet; and a foreign material outlet port formed in the holder and discharging the foreign material collected in the foreign material collecting coil when the supply of power to the foreign material collecting coil is released to outside.

4 Claims, 1 Drawing Sheet

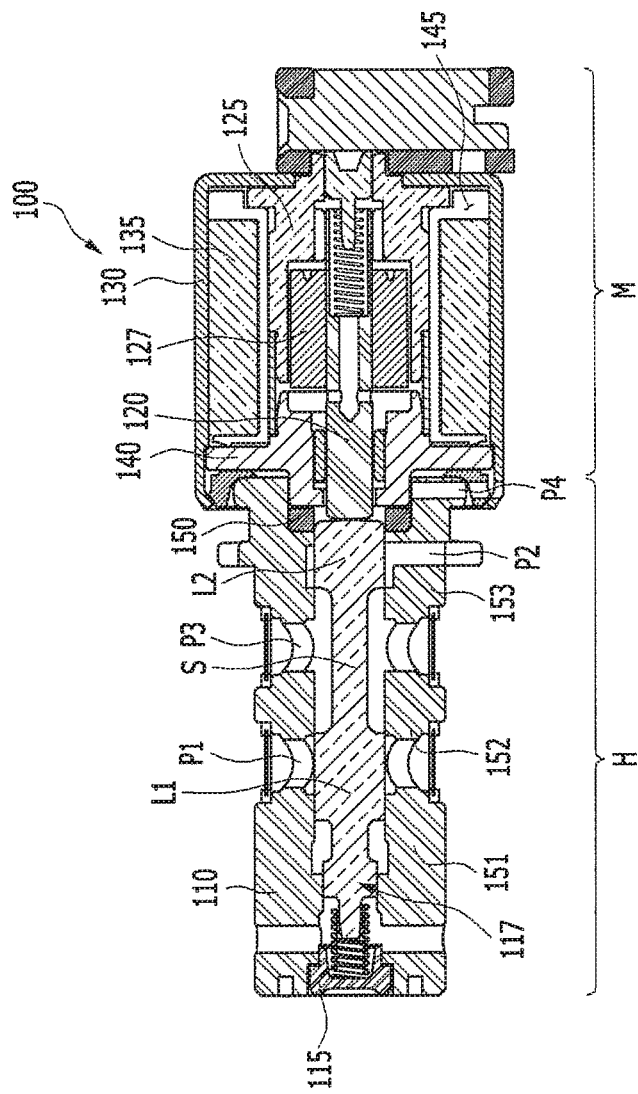

SOLENOID VALVE

CROSS-REFERENCE TO RELATED APPLICATION

This application claims the benefit of priority to Korean Patent Application No. 10-2016-0037412 filed in the Korean Intellectual Property Office on Mar. 29, 2016, the entire content of which is incorporated herein by reference.

TECHNICAL FIELD

The present disclosure relates to a solenoid valve, and more particularly, to a solenoid valve capable of preventing an internal pressure from rising.

BACKGROUND

Generally, a solenoid valve is mainly classified into a hydraulic pressure solenoid valve used in a hydraulic circuit, an air solenoid valve used in a pneumatic circuit, a solenoid valve merely using an electromagnetic force, or the like.

Among those, the hydraulic pressure solenoid valve controls a flow of a hydraulic pressure generated from a hydraulic pressure pump to start, stop, change a motion direction of an operating device, or the like.

For example, the hydraulic pressure solenoid valve may be used in the operating devices such as an automatic transmission of a vehicle. The automatic transmission includes a plurality of friction elements such as a clutch and a brake operated by the hydraulic pressure to implement various shift stages. That is, the hydraulic pressure solenoid valve controls an operation of the friction elements. In particular, when the hydraulic pressure solenoid valve is installed at an engine clutch of a hybrid vehicle, an operation of the hydraulic pressure solenoid valve determines basic performance of the hybrid vehicle selectively connecting between an engine and a motor.

However, when foreign materials introduced into the solenoid valve affect an internal pressure of the solenoid valve, automatic transmission performance of the engine-driven vehicle or the hybrid vehicle may deteriorate. The deterioration in performance of the automatic transmission has an adverse effect on driver satisfaction and may cause a severe accident.

The above information disclosed in this Background section is only for enhancement of understanding of the background of the invention, and therefore, it may contain information that does not form the prior art that is already known in this country to a person of ordinary skill in the art.

SUMMARY

The present invention has been made in an effort to provide a solenoid valve having advantages of preventing an internal pressure from excessively rising due to foreign materials.

According to an exemplary embodiment in the present disclosure, a solenoid valve includes a magnetic force generating coil applied with power to generate an electromagnetic force; a valve spool reciprocated depending on the electromagnetic force generated from the magnetic force generating coil; a holder having the valve spool inserted into a hollow thereof and forming a plurality of ports opened and closed depending on the reciprocating motion of the valve spool; a foreign material collecting coil applied with power when power is applied to the magnetic force generating coil to serve as an electromagnet to thereby collect a foreign material; and a foreign material outlet port formed in the holder and discharging the foreign material collected in the foreign material collecting coil when the supply of power to the foreign material collecting coil is released to the outside.

The solenoid valve may further include: a holder part including the holder and the valve spool; a magnetic part including the magnetic force generating coil and a plunger reciprocated by the electromagnetic force generated from the magnetic force generating coil; and a core part forming a boundary between the holder part and the magnetic part.

The valve spool may be pushed by the plunger when power is applied to the magnetic force generating coil and may return to an original position by an elastic member when the supply of power to the magnetic force generating coil is released.

The foreign material collecting coil may be interposed between the core part and the holder and the foreign material outlet port may be formed between the foreign material collecting coil and the core part.

The solenoid valve may further include: a discharge channel discharging oil infiltrated into the magnetic part to the outside, in which the foreign material outlet port may be disposed between the foreign material collecting coil and the discharge channel.

The plurality of ports may include: an oil inlet port formed to supply oil into the holder and selectively opened and closed depending on the reciprocating motion of the valve spool; an oil outlet port formed to discharge the oil in the holder and selectively opened and closed depending on the reciprocating motion of the valve spool; and a control port always opened to discharge the oil supplied through the oil inlet port.

The oil outlet port may be closed when the oil inlet port is opened and may be opened when the oil inlet port is closed.

The foreign material collecting coil may be disposed between the foreign material outlet port and the oil outlet port.

BRIEF DESCRIPTION OF THE DRAWINGS

FIG. 1 is a schematic diagram of a solenoid valve according to an exemplary embodiment in the present disclosure.

DETAILED DESCRIPTION OF THE EMBODIMENTS

An exemplary embodiment in the present disclosure will hereinafter be described in detail with reference to the accompanying drawings.

FIG. 1 is a schematic diagram of a solenoid valve according to an exemplary embodiment in the present disclosure.

As illustrated in FIG. 1, a solenoid valve 100 according to an exemplary embodiment in the present disclosure includes a holder part H, a magnetic part M, and a core part 140 forming a boundary between the holder part H and the magnetic part M.

The holder part H includes a holder 110 and a valve spool 117.

The holder 110 is a valve body of the holder part H and has a hollow cylindrical shape. Further, the holder 110 is provided with a plurality of ports P1, P2, P3, and P4. Further, the plurality of ports P1, P2, P3, and P4 are formed to penetrate through the holder 110 to make an inside and an outside of the holder 110 communicate with each other.

The valve spool 117 is inserted into a hollow of the holder 110 to be reciprocated along a length direction of the holder 110. The valve spool 117 includes a first land L1 and a second land L2 that are inserted into an inner circumferential surface of the holder 110 with little space and a spool shaft S formed to be relatively thinner than the first and second lands L1 and L2 to connect between the first land L1 and the second land L2. Further, an elastic member 115 is disposed between one end of the valve spool 117 and an inner surface of the holder 110 to press the valve spool 117 to one side in a length direction of the holder 110. Further, another end of the valve spool 117 extends to the vicinity of the core part 140.

The plurality of ports P1, P2, P3, and P4 include an oil inlet port P1, an oil outlet port P2, and a control port P3.

The oil inlet port P1 is selectively opened and closed depending on the reciprocating motion of the valve spool 117. Therefore, the oil inlet port P1 selectively communicates with a space between the first land L1 and the second land L2. Here, the oil inlet port P1 is closed by the first land L1 The first land L1 is relatively closer to one end of the valve spool 117 than the second land L2. Further, when the oil inlet port P1 communicates with the space between the first land L1 and the second land L2, oil is introduced into the space between the first land L1 and the second land L2 through the oil inlet port P1.

The oil outlet port P2 is selectively opened and closed depending on the reciprocating motion of the valve spool 117. Therefore, the oil outlet port P2 selectively communicates with the space between the first land L1 and the second land L2. Further, the oil outlet port P2 is closed by the second land L2. Further, when the oil outlet port P2 communicates with the space between the first land L1 and the second land L2, oil in the space between the first land L1 and the second land L2 is discharged through the oil outlet port P2. When the space between the first land L1 and second land L2 and the oil outlet port P2 communicate with each other, the oil inlet port P1 is closed by the first land L1. Here, the second land L2 is disposed at another end of the valve spool 117 and the oil outlet port P2 is disposed to be adjacent to the core part 140.

The control port P3 always communicates with the space between the first land L1 and the second land L2. Therefore, the oil introduced into the oil inlet port P1 is discharged to the control port P3 via the space between the first land L1 and the second land L2 of the valve spool 117. Further, the oil discharged to the control port P3 is supplied to control hydraulic equipment (not illustrated) communicated with the control port P3. The oil discharged through the oil outlet port P2 is the remaining oil that is not discharged through the control port P3.

The magnetic part M generates an electromagnetic force and includes a case 130, a magnetic force generating coil 135, a plunger 120, and a discharge channel 145.

The case 130 is a valve body of the magnetic part M and has a hollow cylindrical shape.

The magnetic force generating coil 135 is disposed on an inner circumferential surface of the case 130. Further, the magnetic force generating coil 135 is applied with power to generate an electromagnetic force.

The plunger 120 reciprocates along a length direction of the case 130. Further, the plunger 120 is integrally disposed with a core 127 enclosed with a yoke 125 in the hollow of the magnetic force generating coil 135. That is, when the magnetic force generating coil 135 is applied with power to generate the electromagnetic force, the plunger 120 longitudinally moves along with the core 127. In this case, one end of the plunger 120 penetrates through the core part 140 to contact the other end of the valve spool 117 and the plunger 120 pushes the other end of the valve spool 117 toward one end thereof by the electromagnetic force generated by the magnetic force generating coil 135. Therefore, the oil inlet port P1 is opened by the electromagnetic force generated by the magnetic force generating coil 135 and when the electromagnetic force is released, the valve spool 117 returns to an original position to close the oil inlet port P1 by the elastic member 115.

The discharge channel 145 is formed to discharge oil infiltrated into the hollow of the magnetic force generating coil 135 from the hollow of the holder 110 to the outside through the core part 140.

However, when foreign material of an iron component infiltrated into the hollow of the holder 110 is increased, the foreign material of the iron component having a large specific gravity is not discharged through the oil outlet port P2, and therefore, the internal pressure of the hollow of the holder 110 increases. Further, even though the foreign material of the iron component having a large specific gravity overflows into the hollow of the magnetic force generating coil 135 due to the increased internal pressure of the hollow of the holder 110, the foreign material does not flow through the discharge channel 145 but may be accumulated.

Hereinafter, a configuration according to an exemplary embodiment in the present disclosure for solving the problem will be described.

The solenoid valve 100 according to the present disclosure further includes a foreign material collecting coil 150 and the foreign material outlet port P4.

The foreign material collecting coil 150 is disposed between the core part 140 and the oil outlet port P2. Further, the foreign material collecting coil 150 is applied with power when power is applied to the magnetic force generating coil 135 to serve as an electromagnet. The foreign material collecting coil 150 that becomes the electromagnet collects the foreign material of the iron component that is not discharged to the oil outlet port P2.

The foreign material outlet port P4 is one of the plurality of ports P1, P2, P3, and P4 formed in the holder 110 and is disposed between the foreign material collecting coil 150 and the core part 140. Further, when the supply of power to the foreign material collecting coil 150 and the magnetic force generating coil 135 is released, the electromagnet function of the foreign material collecting coil 150 is released. Therefore, the foreign material of the iron component collected in the foreign material collecting coil 150 is discharged to the outside the foreign material outlet port P4.

As described above, according to the exemplary embodiment in the present disclosure, the foreign material collecting coil 150 is provided and the foreign material outlet port P4 is formed, thereby effectively discharging the foreign material in the solenoid valve 100. Therefore, it is possible to secure the performance of the solenoid valve 100 by preventing the internal pressure from excessively rising.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A solenoid valve, comprising:
a magnetic force generating coil generating an electromagnetic force;
a valve spool reciprocating depending on the electromagnetic force generated from the magnetic force generating coil;
a holder having the valve spool inserted into a hollow portion of the holder, the holder forming a plurality of ports that are opened and closed depending on a reciprocating motion of the valve spool;
a foreign material collecting coil collecting a foreign material when power is supplied to the magnetic force generating coil to serve as an electromagnet;
a foreign material outlet port formed in the holder and discharging the foreign material collected in the foreign material collecting coil when the supply of power to the foreign material collecting coil is released to outside;
a holder part including the holder and the valve spool;
a magnetic part including the magnetic force generating coil and a plunger which reciprocates by the electromagnetic force generated from the magnetic force generating coil;
a core part forming a boundary between the holder part and the magnetic part; and
a discharge channel discharging oil infiltrated into the magnetic part to outside,
wherein the valve spool is pushed by the plunger when power is supplied to the magnetic force generating coil and returns to an original position by an elastic member when the supply of power to the magnetic force generating coil is released, and
wherein the foreign material outlet port is disposed between the foreign material collecting coil and the discharge channel.

2. The solenoid valve of claim 1, wherein:
the foreign material collecting coil is interposed between the core part and the holder, and the foreign material outlet port is formed between the foreign material collecting coil and the core part.

3. The solenoid valve of claim 1, wherein the plurality of ports include:
an oil inlet port to supply oil into the holder, the oil inlet port selectively opened and closed depending on the reciprocating motion of the valve spool;
an oil outlet port to discharge the oil in the holder, the oil outlet port selectively opened and closed depending on the reciprocating motion of the valve spool; and
a control port to discharge the oil supplied through the oil inlet port, and
the oil outlet port is closed when the oil inlet port is opened, and the oil outlet port is opened when the oil inlet port is closed.

4. The solenoid valve of claim 3, wherein:
the foreign material collecting coil is disposed between the foreign material outlet port and the oil outlet port.

* * * * *